TELEVISION SIGNAL SEPARATOR CIRCUITS

Filed Dec. 20, 1956

INVENTOR.
RICHARD W. SONNENFELDT
BY
ATTORNEY

April 12, 1960 R. W. SONNENFELDT 2,932,689

TELEVISION SIGNAL SEPARATOR CIRCUITS

Filed Dec. 20, 1956 4 Sheets-Sheet 2

INVENTOR.
RICHARD W. SONNENFELDT
BY
[signature]
ATTORNEY

TELEVISION SIGNAL SEPARATOR CIRCUITS

Filed Dec. 20, 1956

INVENTOR.
RICHARD W. SONNENFELDT

BY

ATTORNEY

April 12, 1960 R. W. SONNENFELDT 2,932,689

TELEVISION SIGNAL SEPARATOR CIRCUITS

Filed Dec. 20, 1956 4 Sheets-Sheet 4

INVENTOR.
RICHARD W. SONNENFELDT
BY
[signature]
ATTORNEY

United States Patent Office 2,932,689

Patented Apr. 12, 1960

2,932,689

TELEVISION SIGNAL SEPARATOR CIRCUITS

Richard W. Sonnenfeldt, Haddonfield, N.J., assignor to Radio Corporation of America, a corporation of Delaware Application December 20, 1956, Serial No. 629,537

5 Claims. (Cl. 178—5.4)

The present invention relates to means for separating or gating synchronizing signals from a transmitted signal which contains synchronizing signals at prescribed intervals, using saturable devices. The synchronizing-signal separating devices of the invention are particularly useful in television circuits for separating or gating such signals as vertical and horizontal synchronizing signals, color synchronizing bursts and chrominance signals from a transmitted television signal or for disabling certain circuits in the television receiver when signals such as color synchronizing bursts occur or do not occur.

The color television signal, conforming to standards adapted by the Federal Communications Commission on December 17, 1953, includes a plurality of synchronizing signals including vertical and horizontal synchronizing pulses, and color synchronizing bursts, all of which occur during the picture retrace intervals. The color television signal also includes both a luminance signal and a chrominance signal, conveying respectively brightness information and color-difference signal information, which are both transmitted in the color television signal between horizontal retrace intervals.

It is an object of the invention to provide an improved and simplified means for separating one or more sets of television signal information from a transmitted television signal.

It is another object of the invention to provide improved means for separating color synchronizing bursts from a color television signal.

It is a still further object of the invention to provide an improved means for separating vertical and horizontal synchronizing signals from a television signal.

It is a still further object of the invention to render a circuit, capable of translating both a chrominance signal and also color synchronizing bursts, disabled or nonresponsive to color television signal information during time intervals normally occupied by the color synchronizing bursts or for turning off a chrominance signal channel when the bursts are absent.

According to the present invention, a pair of circuits are coupled by a non-linear saturable reactance device having reactance which is controllable between each of two states, one of which may correspond to a condition wherein the device is in a state of saturation. Signal information occurring during a prescribed time interval of a signal applied to a first of the pair of circuits, is gated to the second of the pair of circuits by causing the reactance of the device to achieve a condition suitable for the translation of information from the first to the second of the circuits only during the time interval occupied by that signal information.

In one circuit for practicing the invention, television signal information is applied to one winding of a magnetic high-$\mu$ iron core having a plurality of windings. A current is passed through a second winding, which controls the amount of flux through the core, and therefore, the permeability of the core, to set up different conditions of flux or permeability during both the time interval when the portion of the television signal information to be separated occurs, and during intervening time intervals, whereby only that portion of the television signal information to be separated is coupled to one of the windings.

In one form of the invention, a high-$\mu$ iron core has three windings; the television signal is applied to a first of the windings. Current is passed through a second winding and varied to saturate the iron core for all time intervals except during the gating intervals. During each gating interval, during which the core is not saturated, flux from the first winding links a third winding and the television signal information occurring during the gating interval is produced in the third winding.

In another form of the invention, an output circuit having a small absolute impedance, compared to the reactance of the input winding of a signal separating device of the invention when the iron core is not saturated, is connected in series with the winding to which the television signal information is applied. The core is saturated between the gating intervals; during these time intervals, the series reactance presented to the applied television signal information by the winding passing through the core is sufficiently large, relative to the impedance of the output load, to cause only television signal information of negligible amplitude to be developed across the output circuit. During the gating intervals, the core is saturated and the series reactance of the core winding is greatly reduced; the television signal information occurring during the gating interval will therefore be developed principally across the output circuit.

In another form of the present invention, a non-linear capacitance is used as a series or a shunt controllable-transmisison or gating device by controlling the saturation or the capacitance of the non-linear capacitance during gating intervals. In one type of circuit of the invention, a non-linear capacitance is employed as an element of a resonant circuit; in such a circuit, the capacity of the non-linear capacitance is changed during the gating interval to change the frequency of the resonant frequency circuit during that interval to a prescribed frequency. At the prescribed frequency, television signals impressed across or applied to the resonant circuit are translated by the resonant circuit to an output circuit; this change of frequency is achieved by voltage-control of the capacitance of the non-linear capacitance between, say, the saturation and an unsaturated state of the non-linear capacitance.

Other circuits of the present invention using controllable-reactance devices, may also be operated to provide no transmission from a portion of a television circuit to a utilization circuit only during a prescribed time interval. The controllable-reactance device of the invention may therefore be employed as either a gate or a "stop" circuit to control the transmission of one or more portions of a television signal from one point to another.

Other and incidental objects of the invention will be understood after a reading of the following specification and a study of the figures where:

Figure 1 is a block diagram of a controllable-saturation device circuit for gating selected television signals during selected time intervals;

Figures 2*a*, 4*a* and 4*b* are diagrams of magnetic-core burst separator circuits;

Figure 2*b* is a time-versus-amplitude diagram of the chrominance and burst portion of a color television signal during the retrace interval;

Figure 2*c* is a hysteresis loop diagram relating the flux through a saturable magnetic core to the current passed through that core;

Figure 3 is a diagram of a color television receiver using various forms of magnetic separator circuits of the present invention.

Figure 5*a* is a schematic diagram of a circuit for periodically changing the capacitance of a non-linear capacitance;

Figure 5*b* shows waveforms relating applied voltage and capacitor capacitance of the circuit of Figure 4*a*;

*Controllable reactance gate circuits*

Figures 1, 2A, 2B, 2C, 4A, 4B, 5A, 5B, 6, 7, 8:
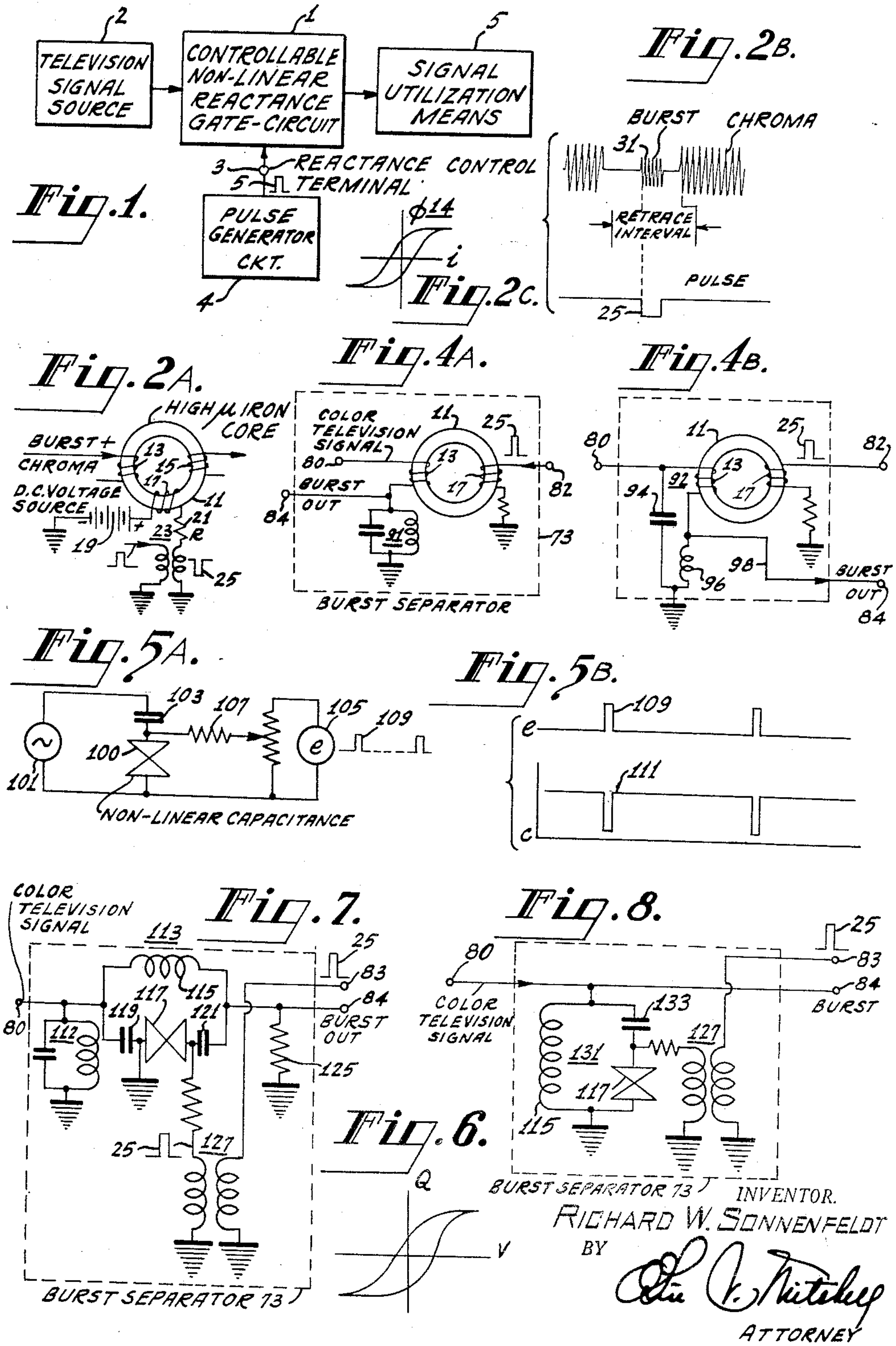
Figure 6 is a hysteresis loop diagram relating the charge in a non-linear capacitance to a voltage developed across the non-linear capacitance.
Figures 7 and 8 are circuit diagrams of burst separator circuits employing non-linear capacitors as signal separation devices.

According to the invention, the gating or separation of synchronizing signals from a television signal or the "stopping" of such said signals from being translated to a utilization circuit, is optimally performed by controllable non-linear reactances capable of being adjusted between two or more states of reactance and used as variable transmission or impedance networks. These states of reactances may correspond to states where a material used for the reactance is switched between a state of saturation and non-saturation. Controllable reactances of the present invention, using circuits which will be presently described in detail, may be either circuits of positive reactance or circuits of negative reactance, that is, circuits which are inductive or circuits which are capacitive. In virtue of the fact that the controllable reactances are switched or adjusted by switching saturable materials, used for the non-linear reactance, between states such as saturation and non-saturation, such controllable reactances are hereinafter referred to as controllable non-linear reactances.

Typical controllable non-linear reactances of the inductive type use saturable high-$\mu$ iron cores having windings including a reactance control winding; the reactance is controlled by passing current through the reactance control winding to vary the permeability of the high-$\mu$ iron core between prescribed values.

A controllable non-linear reactance of the capacitive type may take the form of, say, a ceramic barium titanate crystal which is a non-linear capacitance and whose capacitance can be controlled by varying the intensity of an electrical field developed across the crystal in the direction of its ferro-electric axis.

Controllable non-linear reactance devices of the present invention may be utilized (*a*) as controllable series transmission elements, (*b*) as controllable shunt elements, or (*c*) as controllable frequency changing elements in a resonant circuit, to cause signal information occurring during a prescribed time interval to be translated or to be prevented from being translated to a signal utilization means.

A television signal is typical of the signals used in electrical communications, having various types of synchronizing signals which are either used for controlling various television circuits, or which must be prevented from being translated to certain television circuits.

Non-linear reactance gate or "stop" circuits of the invention are particularly useful in color television receivers, where, (*a*) the presence or absence of color synchronizing bursts in the received television signal, is determined and the gain through a chrominance signal amplifier is provided only when the bursts are present (as in a color killer), (*b*) picture synchronizing pulses and color synchronizing bursts are gated to keyed A.G.C. circuits and burst-synchronized reference signal sources, respectively; (*c*) color synchronizing bursts are prevented from passing through a chrominance channel during burst time.

A typical circuit using a controllable non-linear reactance gate circuit of the present invention is shown in Figure 1. A television signal source 2 is used to apply a television signal to the controllable non-linear reactance gate circuit 1; the latter-named circuit has a reactance control terminal 3. A voltage applied to this terminal or a current passing through this terminal controls the reactance of the controllable non-linear reactance gate circuit 1.

A pulse generator circuit 4 applies pulses to the reactance control terminal 3. These pulses 5 have a magnitude and polarity sufficient to either cause the non-linear reactance gate circuit 1 to gate during the time intervals that selected signals of the television signal source occur, or to gate during time intervals between the occurrence of these selected signals. The output of the controllable non-linear reactance gate circuit 1 is coupled to the signal utilization means 5.

In the specification to follows, numerous types of controllable non-linear reactance gate and "stop" circuits will be described; these gate and "stop" circuits will employ non-linear inductance and the non-linear capacitance variety.

*Non-linear magnetic gate and stop circuits*

A gate circuit of the present invention, adapted for separating color synchronizing bursts from a color television signal, is shown in Figure 2*a*. The circuit is a non-linear magnetic burst separator, hereinafter referred to as magnetic burst separator circuit 10, and includes a high-$\mu$ iron core 11. In the circuit shown in Figure 2*a*, a trio of windings 13, 15 and 17 are wound on the high-$\mu$ iron core 11.

A television signal comprising either an entire color television signal including luminance, chrominance, and color synchronizing burst information, or only the chrominance signal and the color synchronizing bursts, is applied to the winding 13, designated as the input winding 13. The winding 17, designated as the saturating winding 17, is connected in series with a bias source 19, a resistor 21, and the secondary winding of a pulse transformer 23 which is adapted to provide a pulse 25 across this secondary pulse 23. The pulse 25 is caused to occur during a time interval which is substantially in coincidence with the time interval during which the color synchronizing bursts 31 occur in the input winding 13. As is shown in Figure 2*b*, the color synchronizing bursts 31 occur during the latter portion of the retrace interval and the pulse 25 occurs in coincidence with these bursts.

The high-$\mu$ iron core 11 is designed to have a hysteresis curve relationship between the flux ($\theta$), and the current $i$ passing through a winding which threads the core. As is evident from the diagram of the hysteresis loop 14 illustrated in Figure 2*c*, saturation of the high-$\mu$ iron core 11 occurs for values of current above a determinable threshold level.

When the high-$\mu$ iron core 11 is saturated substantially no magnetic coupling will exist between the input winding 13 and the winding 15. The latter named winding is hereinafter referred to as the output winding 15. The high-$\mu$ iron core 11 is caused to be saturated by current produced by the voltage source 19, which passes current through the saturation winding 17 and therefrom through the resistor 21 and the secondary winding of the pulse transformer 23.

The pulse 25 is caused to have an amplitude and polarity sufficient to desaturate the high-$\mu$ iron core 11, at least during the time intervals during which the color synchronizing bursts 31 occur; during the duration interval of each of the pulses 25 the high-$\mu$ iron core 11 is unsaturated and the color synchronizing bursts which are applied to the input winding 13 during the pulse 25 are developed in the output winding 15.

The magnetic burst separator circuit 10 using the high-$\mu$ iron core 11, which is operated in the manner described, is capable of separating color synchronizing bursts from either a complete color television signal, or from a signal including only the chrominance signal and the color synchronizing bursts. The above magnetic burst separator circuit is positive and reliable and has the advantage of using structure which is both simple and easy to construct.

It is to be appreciated that the amplitude of the bursts appearing across the output winding 15 will be a function of both the permeability of the high-$\mu$ iron core during the burst interval, and of the ratio between the number of turns of the input winding 13 and the number of turns of the output winding 15. This turns-ratio is fixed, once the windings have been wound on the high-$\mu$ iron core 11.

*A color television receiver*

Figure 3:
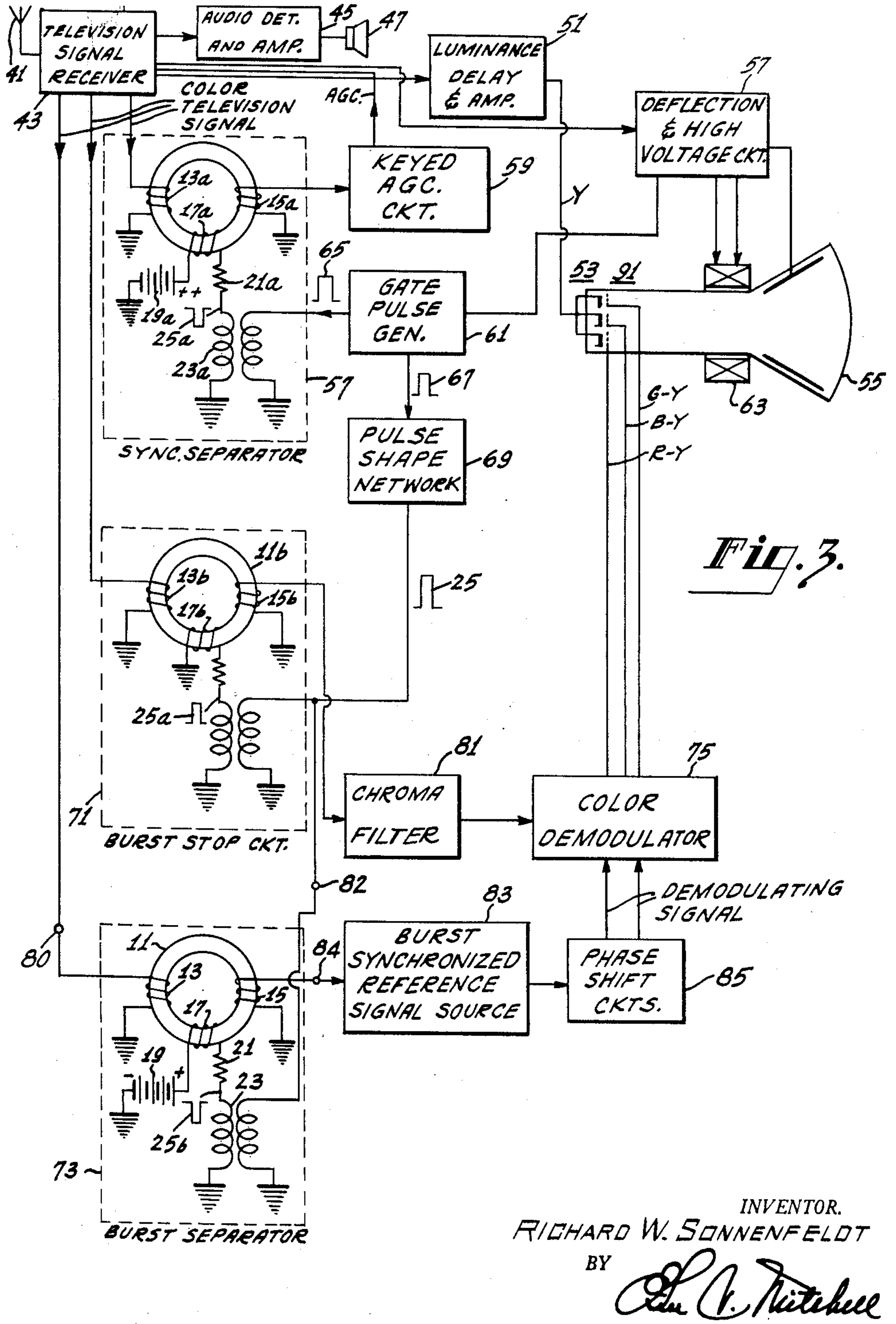

Figure 3 is a diagram of a color television receiver using non-linear magnetic gate or stop circuits of the present invention having three functions; these functions include the separation of the picture synchronizing pulses from the color television signal, the separation of the color synchronizing bursts from the color television signal (in a manner already described in connection with Figure 2*a*), and also the separation of chrominance signal information occurring during each scanning interval of the color television signal for use in the chrominance signal channels of the color television receiver.

In the circuit of Figure 3, the incoming signal from a broadcasting station is received at the antenna 41 and applied to the television signal receiver 43. The television signal receiver 43 demodulates the color television signal from the incoming signal. The demodulated color television signal includes a luminance signal, a chrominance signal, color synchronizing bursts, picture synchronizing signals and the frequency modulated sound carrier which is transmitted at a carrier frequency 4½ mc. removed from the picture carrier. The picture deflection signals include both horizontal and vertical synchronizing pulses which occur during the horizontal and vertical blanking interval, respectively. The color synchronizing bursts occur on the "back porch" of each horizontal synchronizing pulse and comprise a burst of a 3.58 mc. alternating-current wave which is utilized as a reference phase signal in the circuits employed for color demodulation. The chrominance signal consists of a 3.58 mc. subcarrier which is modulated by color difference signals in a manner whereby each of a gamut of color difference signals occurs at a phase of the chrominance signal as referred to the reference phase which is indicated by the color synchronizing bursts. The amplitude of the color difference signal information occurring at each phase of the chrominance signal is indicative of the saturation of the color information at that phase, when considered in combination with luminance or brightness information which is transmitted in the luminance signal. The luminance signal consists of wide band brightness information having a bandwidth from substantially 0 to 4.2 mc.

The color television signal is applied to the audio detector and amplifier 45 which separates the frequency modulated sound carrier from the color television signal, demodulates the audio information, using, for example, an intercarrier sound circuit, and applies the amplified audio information to the loud speaker 47.

The color television signal, when not subjected to color demodulation processes in a manner to be described, consists principally of luminance signal information. This luminance signal information is amplified and delayed in the luminance delay and amplifier 51 and applied therefrom to the cathodes 53 of the color kinescope 55.

The color television signal is applied to the deflection and high voltage circuits 57 wherein the horizontal and vertical synchronizing pulses are separated from the color television signal and used to develop vertical and horizontal deflection signals and also a high voltage. The vertical and horizontal deflection signals are applied to the deflecting yokes 63; the high voltage is applied to the ultor of the color kinescope 55. The deflection and high voltage circuit 57 also energizes the gate pulse generator 61 which produces gate or flyback pulses 65 and 67 respectively. The gate pulse 67 is applied to the pulse shaping network 69, to develop the gate pulse 25 having a duration interval substantially equal to and in coincidence with the duration interval of the bursts. The gate pulse generator 61 also produces the gate pulse 65 which has a duration interval in coincidence with a prescribed portion of each horizontal synchronizing pulse. The gate pulse generator 61 may be a multivibrator circuit which is responsive to horizontal synchronizing pulses produced in the deflection and high voltage circuit 57, or may take the form of an auxiliary winding on a transformer in the high voltage circuit of the deflection and high voltage circuit 57.

Three circuits, each illustrating an embodiment of the present invention are included in the color television receiver circuit of Figure 3. These circuits include the sync separator 57, a burst stop circuit 71 and the burst separator circuit 73.

The sync separator 57 separates the horizontal sync pulse information from the color television signal and applies the separated horizontal sync pulse information to the keyed A.G.C. circuit 59.

The burst stop circuit 71 prevents the burst information from entering the chroma filter 81 of the chrominance signal channel. If the color synchronizing bursts were to pass to chroma filter 81, these bursts would be demodulated by the color demodulators 75 causing the color kinescope 55 to be lit-up during portions of each retrace interval.

The burst separator 73 separates the color synchronizing bursts from the color television signal. Each of the above named circuits and their associated circuits are described in detail as follows.

The sync separator 57 employs a high-$\mu$ iron core **11*a* on which is wound an input winding 13*a*, an output winding 15*a*, and a saturating winding 17*a*. The color television signal is applied to the input winding 13*a*. A current supplied by the battery 19*a* is passed through the saturating winding 17*a* to saturate the high-$\mu$ iron core 11*a* so that color television information will not be induced in the output winding 15*a* while the iron core 11*a* is saturated. The saturating winding 17*a* is connected by way of the resistor 21*a* to the secondary winding 23*a*, across which is developed the pulse 65*a* having a polarity opposite to the polarity of the saturating current passing through the secondary winding 23*a*. The resistor 21*a* causes the current through the saturating winding 17*a* to be determined by the resistance of the circuit and not by the inductance presented by the saturated winding 17*a***.

The pulse **65*a* therefore produces the bursts of current through the saturating winding 17*a* during the time interval that the horizontal synchronizing pulses occur in the input windings 13*a*. The pulse of current occurring in the saturating winding 17*a* due to the pulse 65*a* thereupon causes the high-$\mu$ iron core 11*a* to be desaturated for the duration of the pulse 65*a*. While the high-$\mu$ iron core 11*a* is in the state of desaturation, the horizontal synchronizing pulses will be translated from the input winding 13*a* to the output winding 15*a* and applied therefrom to the keyed A.G.C. circuit 59. Using a keyed A.G.C. circuit of a type described, for example, by Wendt and Schroeder in their paper entitled "Automatic Gain Controls for Television Receivers" (RCA Review, September 1948), an A.G.C. or automatic gain control voltage is developed; the A.G.C. voltage is applied to the television receiver 43** for automatic gain control of circuits such as an intermediate frequency amplifier included therein.

The chrominance signal is processed in the circuits which include the chroma filter 81 and the color demodulator 75. In the circuit shown in Figure 2, only that portion of the color television signal existing during the scan line is supplied by the burst stop circuit 71 to the chroma filter 81. The chroma filter is a band pass filter circuit having a pass band from approximately 2 to 4.2 mc., thereby separating from the color television signal, those signal components comprising principally chrominance signal components; the output signal of the chroma filter 81 is the chrominance signal or chroma. The chrominance signal is applied to the color demodulators 75.

The burst separator 73 is a gate circuit which separates the color synchronizing bursts from the color television signal and which applies the separated bursts to the burst synchronized reference signal source 83. The burst synchronized reference signal source 83 is a circuit using, alternatively, a ringing circuit, or an injection locked oscillator, or an oscillator controlled by a reactance tube and a phase discriminator, to provide a reference signal whose phase is accurately synchronized to a phase prescribed by the color synchronizing bursts and whose frequency is that of the mean frequency of the chrominance signal.

The phase synchronized reference signal is applied to phase shift circuits 85 wherein a plurality of demodulating signals, having the frequency of the color synchronizing bursts and having phases corresponding to phases of selected color difference signal information in the chrominance signal, are developed. The demodulating signals are applied to the color demodulators 75 wherein a trio of color difference signals denoted as R—Y, B—Y and G—Y are developed. R, B and G denote red, blue and green component color information and Y denotes the luminance signal. Each of these color difference signals may have a band width in the range from 0 to 1½ mc. and constitutes color difference information which when combined with the luminance signal produces a corresponding component color signal. For example, an R—Y color difference signal combined with the luminance signal yields an R or red component color signal which describes the red component of a televised image.

The R—Y, B—Y and G—Y color difference signals are applied to the control grids 91 of the color kinescope 55; the addition of each color difference signal with the luminance or Y signal takes place in the electron stream of the electron gun which bombards the portion target area of the color kinescope 55 which produces light output at the corresponding component color.

The burst stop circuit 71 includes a high-$\mu$ iron core **11*b* having an input winding 13*b*, an output winding 15*b* and a saturating winding 17*b*. The high-$\mu$ iron core 11*b* is unsaturated during each scanning line thereupon permitting the color television signal to be translated from the input winding 13*b* to the output winding 15*b* and therefrom to the chroma filter 81. The gate pulse 25, which has a duration interval in coincidence with each color synchronizing burst, is caused to induce a pulse 25*a* across the saturating winding 17*b*. The pulse 25*a* is of sufficient magnitude to saturate the high-$\mu$ iron core 11*b* and thereby to prevent the color synchronizing bursts, which occur in the input winding 13*b* during the gate pulse 25*a*, from being induced into the output winding 15*b* and therefrom to the chroma filter 81 and the color demodulators 75. Also a possible feedback of reference signal information from the color demodulators 75** to a point where it could contaminate the color synchronizing bursts is prevented.

The burst separator 73 of Figure 3 is similar to the burst separator circuit of Figure 2*a*. The color television signal is applied to the input winding 13 of the burst separator 73. Current from a bias source 19 is passed through the saturating winding 17 to saturate the high-$\mu$ iron core. While the high-$\mu$ iron core is saturated, no color television signal information applied to the input winding 13 by the television receiver 43, can be induced into the output winding 15. The gate pulse 25 is produced in the secondary winding 23 of the pulse transformer; the secondary winding 23 is connected in series with the resistor 71 and the saturating winding 17. The gate pulse **25*b* has a polarity and magnitude sufficient to desaturate the high-$\mu$ iron core of the burst separator 73 for the duration of the gate pulse 25*b*. During this period when the high-$\mu$ iron core 11 is not saturated, the color synchronizing bursts which are at that time applied to the input winding 13 by television signal receiver 43, are induced into the output winding 15 and therefrom to the burst synchronized reference signal source 83**.

Figure 4*a* is a circuit diagram of an alternative form of a burst separator 73 of the present invention. The burst separator 73 uses a high-$\mu$ iron core 11 and includes an input winding 13 and an output winding 15. The input winding 13 is connected in series with the resonant circuit 91 whose resonant frequency is adjusted to that of the color synchronizing bursts. The gate pulse 25, occurring in coincidence with the color synchronizing bursts, is applied by way of the terminal 82 to the saturating winding 17 and utilized therein to saturate the high-$\mu$ iron core 11 for the duration interval of each gate pulse 25. During the time interval that each gate pulse 25 is applied to the saturating winding 17, the high-$\mu$ iron core 11 is saturated. The inductance of the input winding 13, while the high-$\mu$ iron core 11 is in a saturated state, is at a minimum value; since the resonant circuit 91 is a high impedance circuit relative to the reactance of the input winding during the burst interval, the bursts will be developed principally across the resonant circuit 91 and applied therefrom by way of terminal 84 to the burst synchronized reference signal source 83. During the time intervals between the gate pulses 25, the high-$\mu$ iron core 11 is not saturated, and the inductance as presented by the input winding 13 in conjunction with the unsaturated high-$\mu$ iron core 11 will be very large; the reactance of the input winding 13 during this time is considerably larger than the impedance of the resonant circuit 91 and the color television signal information which occurs during the time intervals between the gate pulses 25 will thereby be developed with large amplitude across the input winding 13 and with negligible amplitude across the resonant circuit 91.

Figure 4*b* is a diagram of another form of burst separator 73 which can be used for separating the color synchronizing bursts from the color television signal in the color television receiver in Figure 3. In the burst separator 73 of Figure 4*b*, the winding 13 of the high-$\mu$ iron core 11 forms a portion of the resonant circuit 92. The resonant circuit 92 includes not only the winding 13 but also a capacitance 94 and a winding 96; the winding 13 of the high-$\mu$ iron core and the winding 96 are in series. This arrangement shown in Figure 3*b* is alternative to other arrangements wherein the winding 13 may constitute the entire inductance of the resonant circuit 92 or included in the series arm which includes the capacitance 94.

The parameters of the resonant circuit 92 are so designed that during the gate pulse 25, the permeability of the high-$\mu$ iron core 11 is adjusted to a value whereby the inductance presented by the winding 13 in combination with the inductance 96 and the capacitance 94 causes the resonant circuit 92 to be sharply resonant at burst frequency. The output 98 which is connected to the common connection of the winding 13 and the inductance 96 thereupon couples the burst which is developed in the resonant circuit 92 to the output terminal 84.

When the gate pulses 25 are not present, the permeability of the high-$\mu$ iron core 11 is such that the inductance of the winding 13 assumes a value whereby the resonant frequency of the resonant circuit 92 is shifted to a frequency removed from the frequency of the color synchronizing bursts. During this time the television signal information will not develop a voltage of appreciable magnitude at the output terminal 84; the circuit of Figure 4*b* therefore functions as a burst separator.

*Non-linear capacitance gate and stop circuits*

There are dielectric materials whose electric polarization P is a non-linear function of an applied electric field E; such dielectric materials may also be considered to have a non-linear relationship between the charge $q$ flowing through the dielectric material, as a function of the voltage $v$ which is applied to it. Dielectric materials which have the above relationship in the form of a hysteresis loop are also called ferro-electric materials; variations of an electric field applied to a ferro-electric type of dielectric material, such as barium titanate, along what is known as a ferro-electric axis, will change the dielectric constant of the barium titanate. A condenser using such a material for a dielectric may therefore be considered to be a non-linear capacitance, inasmuch as a non-linear relationship will exist between the capacitance and the magnitude of the applied electric field.

A non-linear capacitance 100 of, typically, ceramic barium titanate, is shown in Figure 5*a* in a circuit which is adapted to provide control of the capacitance of the non-linear capacitance 100. An alternating current generator 101 is connected to drive the non-linear capacitance 100 by way of the by-pass condenser 103 whose function is to provide direct current isolation of the alternating current generator 101 from the non-linear capacitance 100.

The ability of certain dielectric materials, such as ceramic barium titanate, to act as non-linear reactance or a non-linear capacitance can be understood by considering the characteristic curves shown in Figure 6. These characteristic curves relate the charge $q$ in the non-linear capacitance to the voltage developed across the non-linear capacitance. As can be seen from the curves of Figure 6, the relationship between the charge and the voltage is non-linear and is a hysteretic relationship, the exact area of the hysteresis loop being a function of the materials involved. If a ceramic barium titanate is used, for example, the two corresponding portions of the hysteresis loop at points of no saturation may almost coincide. If a pure crystal of barium titanate is used so that the barium titanate crystal is saturable at remanance, a considerable area may be bounded by the hysteresis curves and indeed the charge state of a pure crystal of barium titanate for the same value of applied voltage may take on multiplicity of values.

The capacitance of a non-linear capacitance, using ceramic barium titanate, is equal to the derivative of the charge of the dielectric with respect to the applied voltage. As is seen from the curves of Figure 6, this derivative at saturation is virtually zero and there the capacitance of a ceramic barium titanate condenser will have its smallest value. At the point where the voltage is passed through the axis (where the charge $q$ is equal to zero), the rate of the change of the curves will be greatest and the capacitance presented by ceramic barium titanate condenser will be at its greatest value. It follows, therefore, from the curves of Figure 5 that materials such as ceramic barium titanate are capable of having multiplicity of values of capacitance between each of two extremes, with each of the extremes representing the smallest amount of capacitance displayed by a condenser using the aforementioned material as a dielectric.

A pulser 105 is coupled to apply a train of pulses across the non-linear capacitance 100 by way of the resistance 107. The train of pulses are assigned the numeral 109 and, as is illustrated by the line 111 of the diagram of Figure 5*b*, the capacitance of the non-linear capacitance 100 is decreased during each pulse.

Burst separator circuits, using non-linear capacitances to provide burst separation, which illustrate circuits which may be used for separating or multiplexing a portion of a transmitted signal, are shown in Figures 7 and 8.

In the burst separator 73 of Figure 7 the color television signal is applied by way of terminal 80 to a resonant circuit 113 which is serially connected between terminal 80 and the burst output terminal 84. A resonant circuit 112, having sharp resonance at the frequency of the color synchronizing bursts, is connected between the terminal 80 and ground so that only information at burst frequency will be developed with a voltage of usable magnitude, at the terminal 80. The resonant circuit 113 includes an inductance 115 and a non-linear capacitance 117, which are connected using bypass condensers 119 and 121 to form a parallel resonant circuit which is resonant at the frequency of the bursts when no direct current electric field is applied to the non-linear capacitance 117. If the impedance of the resonant circuit 113 is considerably larger in magnitude than the resistance of the resistor 125 which is connected between the burst output terminal 84 and ground, signals having the burst frequency will be developed principally across the resonant circuit 113 and only with negligible amplitude between the burst output circuit and ground.

In the burst separator 73 of Figure 7 the gate pulses 25, occurring in time coincidence with the color synchronizing bursts, are applied to the terminal 83 and applied therefrom to the pulse transformer 127. The pulses 25 are thereupon applied across the non-linear capacitance 117 in a manner whereby the dielectric constant of the non-linear capacity is altered during burst time. The pulses 25 cause the capacity of the capacitance 117, during burst time, to be greatly reduced, thereby greatly increasing the resonant frequency of the resonant circuit 113; therefore, the color synchronizing bursts, developed at that time across the input resonant circuit 112, pass through the non-linear capacitance 117 and are developed across the resistor 125 at the output terminal 84.

Figure 8 is a schematic diagram of an alternative arrangement of a burst separator circuit using a non-linear capacitance. The color television signal is applied by way of terminal 80 to the resonant circuit 131. The resonant circuit 131 consists of an inductance 115 which is in parallel with a serially connected non-linear capacitance 117 and a bypass capacitance 133. The resonant circuit 131 is connected between the terminal 80 and ground. The gate pulses 25 are applied by way of terminal 83 and the pulse transformer 127 to the non-linear capacitance 117 to cause a change in the capacity of the capacitance 117 during burst time. The circuit parameters of the burst separator 73 are designed whereby during burst time, the non-linear capacitance 117 presents a capacitance in the resonant circuit 131, responsive to the gate pulses 25, to cause the resonant circuit 131 to be resonant at the frequency of the bursts. The resonant circuit 131, thereby provides a high impedance to the color synchronizing bursts which are developed at the terminal 80 during the gate pulses 25, and the color synchronizing bursts are thereupon provided at the burst output terminal 84.

During time intervals between the gate pulses 25, the capacitance of the non-linear capacitance 117 will be much greater or smaller than that capacitance existing during the gate pulse 25 depending on the polarity of the gate pulses. The resonant circuit 131 will thereupon have a high impedance between gate pulses 25 at a frequency substantially different from the frequency of the color synchronizing bursts and only color television signal information of negligible amplitude will be developed at the output terminal 84 for time intervals between the gate pulses 25.

Figures 7 and 8 have shown the non-linear capacitances incorporated in resonant circuits; it is to be understood by one skilled in the art that non-linear capacitances, having controllable capacitance, may also be used directly as series or shunt transmission-control elements for signal separation in a television receiver without necessitating the use of a resonant circuit.

*Color killer circuits*

Signal separator and stop circuits of the present invention may also be used in color television receivers for color killer action. Color killer circuits are employed in color television receivers to turn off the chrominance channels when the color synchronizing bursts are absent in the received signal (the received signal thereby being a signal containing only monochrome information). If the color killer circuit were not used in the color television receiver, higher frequency brightness information transmitted in the television signal during the transmission of monochrome information would pass through the chroma filter 81 and into the color demodulators 75 of, say, the color television receiver of Figure 3 to cause false and spurious color information to be reproduced by the color kinescope 55.

Since the color synchronizing bursts occur only during color transmission, the occurrence or the absence of these bursts may be used as an indication of the type of transmission being received with the resulting indication accordingly used to control the transmission of the chrominance channel. It is to be appreciated that the chrominance channel is considered to be that group of circuits including (*a*) the circuits which filter the chrominance signal from the color television signal, (*b*) the circuits which amplify the chrominance signal, (*c*) the circuits which demodulate the chrominance signal, and (*d*) the circuits which amplify and apply demodulated color difference signal information to the color kinescope 55.

Figure 9:
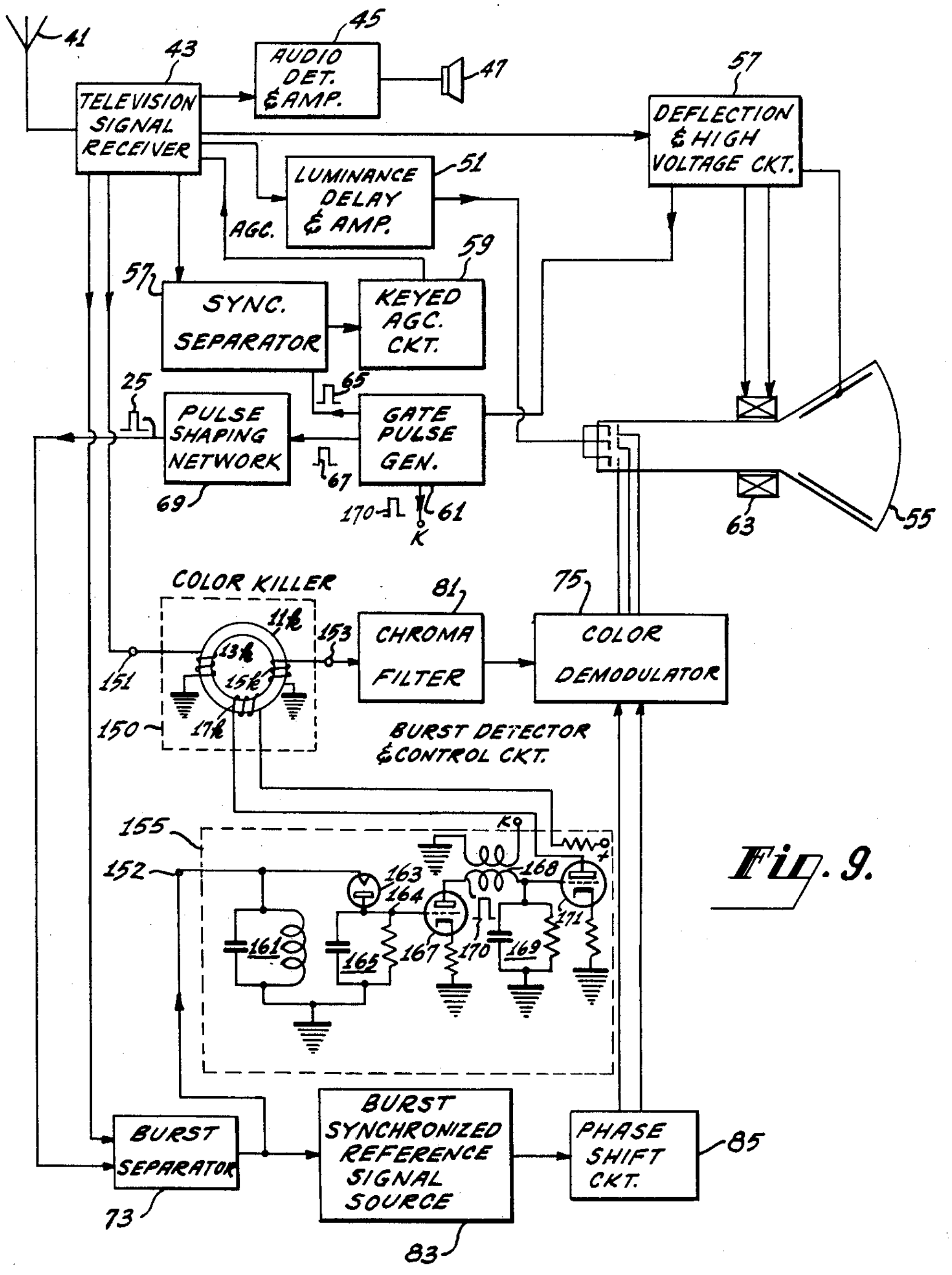
Figure 9 is a diagram of a color television receiver using a color killer circuit of the present invention.

A color television receiver using a color killer employing a non-linear reactance according to the present invention, is shown in Figure 9. In the color television receiver of Figure 9, circuits which provide the same functions as those described in the color television receiver of Figure 2 are assigned the same numeral.

The color killer 150 of Figure 9 includes a high-$\mu$ iron core 11*k*. The television signal is applied by way of terminal 151 to the input winding 13*k*. The output winding 15*k* is connected by way of terminal 153 to the chroma filter 81. A current applied through the saturating winding 17*k* from the burst detector and control circuit 155 will saturate the high-$\mu$ iron core 11*k* when the bursts are absent, thereby preventing television signal information from being applied to the chroma filter 81 during this time. When the bursts are present, the burst detector and control circuit 155 will apply a current to the saturating winding 17*k* of a magnitude insufficient to cause saturation of the high-$\mu$ iron core 11*k*, thereby creating the flux condition in the high-$\mu$ iron core 11*k* whereby the television signal information is coupled from the input winding 13*k* to the output winding 15*k* and therefrom to the chroma filter 81. It is to be appreciated that whereas the color killer 150 is shown at the input to the chroma filter 81 in Figure 9, this circuit may be included at any point in the chrominance channel to provide the benefits of the present invention.

The burst detector and control circuit 155 includes a burst-frequency resonant circuit 161. The burst-frequency resonant circuit 161 is shunted by a rectifier 163 connected in series with a resistance-condenser network 165. The output of the burst-separator is coupled to the burst-frequency resonant circuit 161.

The color synchronizing bursts, when present, are separated by the burst separator 73 and developed therefrom across the burst-frequency resonant circuit 161 to produce a negative voltage at the terminal 164 of the resistance-condenser network 165. When no bursts are developed across the burst-frequency resonant circuit 161, negligible voltage is developed across the resistance-condenser network 165.

The terminal 164 of the resistance-condenser network 165 is coupled to the control grid of a tube 167. The anode and cathode of tube 167 are connected in series with the secondary of a pulse transformer 168 and a control resistance-condenser network 169. A pulse 170, generated during the retrace interval by the gate-pulse generator 61, is furnished to the primary of the pulse transformer 168 by connections between the terminals *k* of the gate-pulse generator 61 and of the pulse transformer 168.

When the bursts are present, a negative voltage developed at the terminal 164 cuts off tube 167 and no voltage is developed across the control resistance-condenser network 169. When the bursts are not present, the tube 167 is not biased to cut off and the pulse 170 produces current through both tubes 167; the control resistance-condenser network 169 thereupon develops a positive voltage.

The control resistance-condenser network 169 is used to control the grid bias of tube 171 whose anode is coupled to provide current to the saturating winding 17*k* of the color killer 150. When the bursts are not present, the positive voltage developed across the control resistance-condenser network 169 and applied to the control grid of tube 171 causes a flow of current through the saturating winding of the color killer 150 which saturates the iron core 11*k* and therefore prevents television information from passing through to the chroma filter 81 by way of the output winding 15*k*. When the bursts are present, tube 167 is cut off and the pulses 170 produce negligible voltage across the control resistance-condenser network 169. The tube 171 thereupon provides negligible current to the saturating winding 17*k* whereby the iron core 11*k* is not saturated and transmission is permitted between the input winding 13*k* and the output winding 15*k* of the color killer 150.

Figure 10:
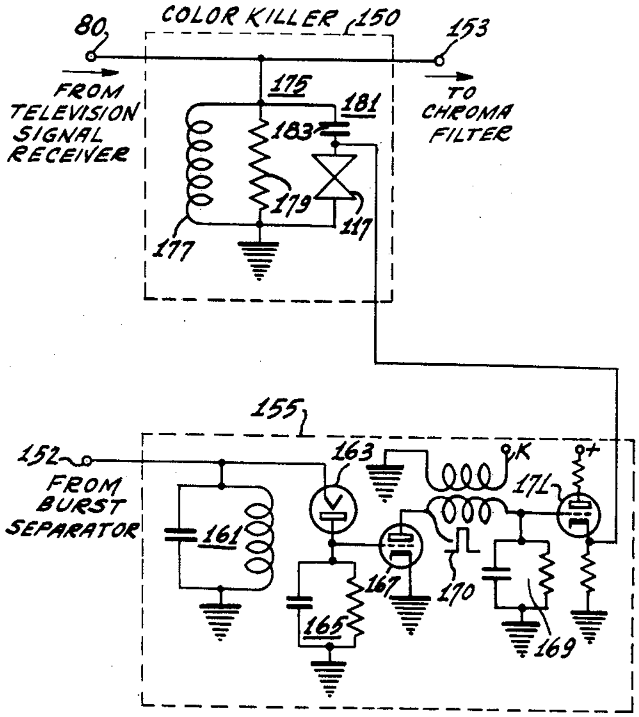
Figure 10 is a diagram of non-linear capacitance type of color killer circuit.

The color killer 150 of Figure 10 has shown the use of a high-$\mu$ magnetic core circuit as the controllable reactance device of the invention. The color killer of Figure 9 shows an alternative type of color killer of the present invention using a non-linear capacitance 117. The television signal is applied from the terminal 80 to the resonant circuit 175 of the color killer 150. The resonant circuit 175 includes an inductance 177 in shunt with a resistive arm 179, and a capacitive arm 181 which includes the by-pass condenser 183 in series with the non-linear capacitance 117. The voltage developed across the resistance-condenser network 165 of the burst detector and control circuit 155 is developed across the non-linear capacitance 117.

The color killer 150 is designed to operate whereby when the bursts are present and a voltage is developed across the non-linear capacitance 117 by the resistance-condenser network 165, the bandpass characteristics of the resonant circuit 175 are suitable for causing the chrominance signal to be developed at the output terminal 153 and therefrom to the chroma filter 181. When the bursts are not present, a voltage of less negative magnitude is developed across the non-linear capacitance 117 by the resistance-condenser network 165 and the parameters of the resonant circuit 175 are such that the change in capacitance of the non-linear capacitance 117, responsive to this value of voltage provided by the resistance-condenser network 165 when the bursts are not present, will detune the resonant circuit 175 so that television signal information is effectively decoupled from the output terminal 153 of the color killer 150.

The circuit of Figure 9 has shown a color killer 150 using a shunt type of resonant circuit similar to that shown in Figure 7. It is to be appreciated that a series-connected resonant circuit of the type shown in Figure 6 may also be employed for color killer action.

Having described the invention, what is claimed is:

1. In a television receiver adapted to receive the television signals including synchronizing signals occurring during predetermined time intervals, a synchronizing signal separating means comprising in combination: a non-linear capacitance capable of having its reactance controlled to either of two values of capacitance, circuit means coupled to said non-linear capacitance and having an input and an output circuit and operatively connected to said non-linear capacitance to make possible transmission from said input to said output circuit during only one of said values of capacitance, means to apply said television signal to said input circuit, and means to adjust the capacitance of said non-linear reactance to said value of capacitance permitting transmission from said input to said output circuit of said circuit means only during a time interval related to said prescribed time interval during which said synchronizing signals occur.

2. In a television receiver having a chrominance signal channel and adapted to receive a television signal which includes both a chrominance signal having a frequency range and also color synchronizing bursts only during color transmission, a color killer circuit comprising in combination: a burst detector circuit responsive to said television signal and including detection circuit means to develop a control signal having a first magnitude when said color synchronizing bursts are present and having a second magnitude when color synchronizing bursts are absent, a resonant circuit including reactive elements including a non-linear capacitance capable of being switched from a first value of capacitance to a second value of capacitance in response to a control voltage, said first value of capacitance causing said resonant circuit to resonate at a frequency range suitable for developing said chrominance signal when present across said resonant circuit, means to apply said television signal to said resonant circuit, means to couple said resonant circuit to said chrominance signal channel, and means to apply said control signal from said burst detector means to said non-linear capacity to control the frequency of said resonant circuit whereby said resonant circuit is capable of applying a signal having the frequency range of said chrominance signal to said chrominance signal channel only during color transmission.

3. In a color television receiver adapted to receive television signals including synchronizing signals having a prescribed frequency and occurring during predetermined time intervals, a synchronizing signal separating means comprising in combination: a non-linear capacitance capable of having its capacitance controlled between each of two values of capacitance responsive to an applied control voltage, a resonant circuit means including said non-linear capacitance as a reactive element for resonating at each of a pair of frequencies corresponding to the frequencies to which said non-linear capacitance may be adjusted by said control voltage, means to apply said synchronizing signal to said resonant circuit, pulse developing means for producing pulses which occur during the time intervals of said synchronizing signals, and means to apply said pulses as control voltages to said non-linear capacitance to cause said resonant circuit to resonate at the frequency of said synchronizing signals only while said synchronizing signals occur, and means to derive said synchronizing signals from said resonant circuit while said resonant circuit resonates at the frequency of said synchronizing signal.

4. In a color television receiver adapted to receive television signals including synchronizing signals having a prescribed frequency and occurring during predetermined time intervals, a synchronizing signal separating means comprising in combination: a non-linear capacitance capable of having its capacitance controlled between each of two values of capacitance responsive to an applied control voltage, a series-path resonant circuit means including said non-linear capacitance as a reactive element for resonating at each of a pair of frequencies corresponding to the frequencies to which said non-linear capacitance may be adjusted by said control voltage, means to apply said synchronizing signal to said resonant circuit, pulse developing means for producing pulses which occur during the time intervals of said synchronizing signals, and means to apply said pulses as control voltages to said non-linear capacitance to cause said resonant circuit to resonate at the frequency of said synchronizing signals only while said synchronizing signals occur, and means to derive said synchronizing signals from said resonant circuit while said resonant circuit resonates at the frequency of said synchronizing signal.

5. In a color television receiver adapted to receive television signals including synchronizing signals having a prescribed frequency and occurring during predetermined time intervals, a synchronizing signal separating means comprising in combination: a non-linear capacitance capable of having its capacitance controlled between each of two values of capacitance responsive to an applied control voltage, a shunt-path resonant circuit means including said non-linear capacitance as a reactive element for resonating at each of a pair of frequencies corresponding to the frequencies to which said non-linear capacitance may be adjusted by said control voltage, means to apply said synchronizing signal to said resonant circuit, pulse developing means for producing pulses which occur during the time intervals of said synchronizing signals, and means to apply said pulses as control voltages to said non-linear capacitance to cause said resonant circuit to resonate at the frequency of said synchronizing signals only while said synchronizing signals occur, and means to derive said synchronizing signals from said resonant circuit while said resonant circuit resonates at the frequency of said synchronizing signal.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |
| 2,801,344 | Lubkin | July 30, 1957 |
| 2,805,409 | Mader | Sept. 3, 1957 |

OTHER REFERENCES

Design Techniques, Electronics, pages 136–143, February 1954.